United States Patent
Guo

(10) Patent No.: US 9,383,473 B2
(45) Date of Patent: Jul. 5, 2016

(54) METHOD FOR CEMENT EVALUATION WITH NEUTRON LOGS

(71) Applicant: Pingjun Guo, Bellaire, TX (US)

(72) Inventor: Pingjun Guo, Bellaire, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 549 days.

(21) Appl. No.: 13/864,918

(22) Filed: Apr. 17, 2013

(65) Prior Publication Data

US 2013/0345983 A1    Dec. 26, 2013

Related U.S. Application Data

(60) Provisional application No. 61/664,544, filed on Jun. 26, 2012.

(51) Int. Cl.
*G01V 5/10* (2006.01)
*E21B 47/00* (2012.01)

(52) U.S. Cl.
CPC ............ *G01V 5/104* (2013.01); *E21B 47/0005* (2013.01)

(58) Field of Classification Search
CPC .................. G01V 5/104; G01V 5/04; G01V 5/101–5/102; G01V 5/105; G01V 5/10; G01V 5/14; E21B 47/0005
See application file for complete search history.

(56) References Cited

U.S. PATENT DOCUMENTS

| | | | |
|---|---|---|---|
| 3,815,677 A | 6/1974 | Pennebaker, Jr. | |
| 6,173,606 B1 | 1/2001 | Mosley | |
| 7,292,942 B2 | 11/2007 | Ellis et al. | |
| 7,380,598 B2 | 6/2008 | Wydrinski et al. | |
| 7,587,373 B2 | 9/2009 | Smith, Jr. et al. | |
| 7,741,841 B2 | 6/2010 | Edwards et al. | |
| 7,775,274 B2 | 8/2010 | Wydrinski et al. | |
| 8,100,177 B2 | 1/2012 | Smith, Jr. et al. | |
| 8,157,008 B2 | 4/2012 | Lilley | |
| 8,201,625 B2 | 6/2012 | Almaguer | |
| 2008/0061225 A1 | 3/2008 | Orban et al. | |
| 2010/0252725 A1 | 10/2010 | Stewart | |

(Continued)

FOREIGN PATENT DOCUMENTS

EP    1 885 996    4/2009
WO   WO 2011/126667   10/2011

(Continued)

OTHER PUBLICATIONS

Goodwin, K.J., Guidelines for Ultrasonic Cement-Sheath Evaluation, 1992, SPE 19538, pp. 280-284.*

(Continued)

*Primary Examiner* — Toan Le
(74) *Attorney, Agent, or Firm* — ExxonMobil Upstream Research Company, Law Dept.

(57) ABSTRACT

Method for evaluating cement integrity in a cased well environment using a logging tool that has a neutron source and one or more neutron or gamma ray detectors. Neutron porosity logs are obtained from the well before (42) and after (41) casing. This log data along with well dimensions and material composition parameters are the input quantities to a multi-parameter database (43) that is constructed by computer modeling or laboratory experiments to relate volume fraction for fluid filled channels in the cement sheath to the input quantities. The channel volume fraction (45) corresponding to the input quantities is identified or interpolated (44) from the multi-parameter database.

11 Claims, 5 Drawing Sheets

(56) References Cited

U.S. PATENT DOCUMENTS

| | | | |
|---|---|---|---|
| 2011/0240302 A1 | 10/2011 | Coludrovich, III | |
| 2011/0253364 A1 | 10/2011 | Mosse et al. | |
| 2011/0290011 A1 | 12/2011 | Dowla et al. | |
| 2012/0075953 A1 | 3/2012 | Chace et al. | |
| 2013/0292109 A1* | 11/2013 | Smith, Jr. | E21B 43/04 166/250.1 |

FOREIGN PATENT DOCUMENTS

| | | |
|---|---|---|
| WO | WO 2011/127156 | 10/2011 |
| WO | WO 2011/152924 | 12/2011 |
| WO | WO 2012/036689 | 3/2012 |

OTHER PUBLICATIONS

Harness et al., Neutron Logs Improve Interpretation of Foamed Cement, Even in Concentric Casing, Dec. 1996, SPE Drilling & Completion, pp. 208-213.*

Guo et al., Fast Neutron Log Modeling in High Angle and Horizontal Wells, Jun. 21-24, 2009, SPWLA 50th Annual Logging Symposium, 10 pp.*

Butsch, R.J. et al. (2002), "The Evaluation of Specialized Cements," SPE 76713, SPE Regional/AAPG Pacific Section Joint Meeting, 11 pgs.

Goodwin, K.J. (1992), "Guidelines for Ultrasonic Cement-Sheath Evaluation," SPE 19538, pp. 280-284.

Grosmangin et al. (1961), "A Sonic Method for Analyzing the Quality of Cementation of Borehole Casings," SPE 1512-G, pp. 165-171.

Harness, P.E. et al. (1992), "New Technique Provides Better Low-Density-Cement Evaluation," SPE 24050, Western Regional Meeting, pp. 249-258.

Harness, P.E. et al. (1996), "Neutron Logs Improve Interpretation of Foamed Cement, Even in Concentric Casing," SPE 35681, pp. 208-213.

Havira, R.M. (1982), "Ultrasonic Cement Bond Evaluation," 1982 SPWLA Annual Logging Symposium, Paper H, 11 pgs.

Leigh, C.A. et al. (1984), "Results of Field Testing the Cement Evaluation Tool," 1984 SPWLA Annual Logging Symposium, 21 pgs.

Rao, R., V.N. (1997), "Parametric Study of Cement Bond Evaluation Using Early Refracted Arrivals," 1997 SPWLA Annual Logging Symposium, 14 pgs.

* cited by examiner

METHOD FOR CEMENT EVALUATION WITH NEUTRON LOGS

CROSS-REFERENCE TO RELATED APPLICATION

This application claims the benefit of U.S. Provisional Patent Application 61/664,544, filed Jun. 26, 2012, entitled METHOD FOR CEMENT EVALUATION WITH NEUTRON LOGS, the entirety of which is incorporated by reference herein.

FIELD OF THE INVENTION

This invention relates generally to the field of production of oil or gas, and more particularly to well drilling. Specifically, the invention is a method for testing cement integrity in cementing around well casings.

BACKGROUND OF THE INVENTION

When a well is drilled and steel casing is placed, cement slurry is pumped into the annular space between casing and formations. The primary objectives of cementing are to provide mechanical support for the steel casing string and to provide zonal isolation between earth strata or formations, i.e. to keep the different zones or strata in the subsurface hydraulically isolated from each other as they were before the well was drilled. Multiple-stage casing and cementing operations are common procedures to establish pressure barriers during drilling a well. It allows the use of heavier drilling muds in drilling deeper sections without damaging or fracturing the shallower formations due to hydrostatic pressure gradient. An ideal cementing job would fill the casing and formation annulus completely with cement. Potential issues often encountered in cementing operations are fluid filled channels within the cement sheath and fluid contaminated cement due to incomplete replacement or sweeping of drilling mud with cement slurry. Zonal isolation assessment is a critical aspect of well integrity tests to ensure hydrocarbon production in a safe manner. Cement evaluation measurements are relied upon to prevent fluid cross flows from unwanted zones other than the producing intervals.

This invention relates to in situ evaluation of cement quality between steel casing and formations in a wellbore. More particularly, this invention relates to a method for in situ detection of fluid channels behind the casing to provide quantitative measurement of cement slurry and fluid volumes. A fluid-filled channel in the cement may allow fluid flows between formation zones and eventually compromise well integrity.

Cement quality surveys are traditionally conducted downhole by running cement bond logging tools in a cased wellbore. Acoustic wave propagation phenomena are exploited to extract physical properties of the media with which the wave interacts. A typical cement bond tool consists of one or more acoustic transducers to emit pressure waves and one or more acoustic receivers to record the returning waveforms. Cement bond logging ("CBL") technology is often loosely categorized as one of the cased hole logging technologies, and it is more closely related to sonic or acoustic logging. Most of the sonic logging tools are designed with an operational mode for CBL measurements in addition to compressional and shear wave as well as other modes.

Cement evaluation techniques have traditionally involved the use of acoustic (sonic and ultrasonic) measurements to infer presence of a cement bond to casing and detect fluid channels if no cement bond is present. The common practice is to make a logging pass while the casing is under hydrostatic pressure only (zero pressure) and to subsequently run another pass while casing is pressurized in order to close out micro annulus between casing and cement. Micro annulus refers to the gap of several microns which often leads to poor bond logs. The CBL measurement principles are based on acoustic wave propagation theory. Cement bond logging tools consist of an acoustic transducer and receiver pairs. Either acoustic amplitude or impedance ("AI") is extracted from the recorded acoustic waveforms and are used to infer bonding between cement and casing and distinguish cement from mud. In recent years, many wells drilled in a low fracture gradient or highly permeable formations are completed with light weight and foam cements to minimize formation damage. These types of cements are difficult to evaluate using traditional acoustic impedance measurements as light weight cements have acoustic properties similar to drilling muds.

Following is a listing of a few selected papers on cement bond evaluation using traditional acoustic logging methods:

Goodwin, K. J., "Guidelines for ultrasonic cement-sheath evaluation," SPE 19538, 1992.
Havira, R. M., "Ultrasonic cement bond evaluation," 1982 SPWLA annual logging symposium, paper N.
Leigh, C. A., "Results of field testing the cement evaluation tool," 1984 SPWLA annual logging symposium, paper H.
Butsch, R. J., "The evaluation of specialized cements," SPE 76713.
Grosmangin, M., "A sonic method for analyzing the quality of cementation of borehole casing," SPE 1512-G, 1961.
Harness, P. E., "New technique provides better low-density-cement evaluation," SPE 24050, 1992.
Rao, N., "Parametric study of cement bond evaluation using early refracted arrivals," 1997 SPWLA annual logging symposium, paper P.

A partial summary follows of other papers on cement evaluation or related well logging techniques.

U.S. Pat. No. 8,100,177 ("Method of logging a well using a thermal neutron absorbing materials") discloses a method to detect formation fracture location and height after a wellbore is hydraulically fractured and fluids loaded with proppants are injected into the fracture openings. The proppants are doped with thermal neutron absorbers that can be detected using a pulsed neutron logging tool. It is not applicable for cement evaluation because the fracture openings extend further beyond the cement sheath.

The disclosure in U.S. Pat. No. 3,815,677, "Method for operating in wells," is related to running an open hole sonic log and cased hole neutron log to detect fluid channels in cement. Running an open hole neutron log is not disclosed. In more detail, the method disclosed in this patent consists of running neutron logs in wells completed with two or more production tubing strings. Neutron logs are acquired in each of the tubing strings separately and then are compared to identify response anomalies caused by fluid channels near one of the tubing strings and whether or not the two logs depart from each other. Neutron logs would read higher porosity values in fluid filled channels than in cement. The method also uses an open hole sonic log which provides open hole porosity measurement similar to neutron porosity. In situations where channels are present around both of the tubing strings, it may be difficult to distinguish channels from cement as neutron porosity values would be very close to each other, and the open hole sonic porosity log would provide a reference porosity log.

PCT International Patent Application Publication WO 2012/036689 ("Combined sonic/pulsed neutron cased hole logging tool") discloses a method for using sonic and pulsed neutron logs simultaneously to evaluate rock properties and cement integrity. It relates to formation and casing evaluation tools and methods of formation valuation, and more particularly a combination of sonic and pulsed neutron tool for formation evaluation through casing and casing and cementing integrity evaluation and methods for using the same. It does not teach obtaining an open hole neutron log, and provides an alternative through a casing formation evaluation tool to open hole formation evaluation tools by combining pulsed neutron and sonic technology in a mono-cable format for use in a single cased hole logging run. It is also an efficient and cost saving approach to obtaining the desired formation evaluation data, such as fluids saturations and rock properties of the reservoir including compressional and shear slownesses, minimium horizontal stress profile, porosity, simple mineralogy, matrix sigma, pseudo formation density, and full wave information for well design and hydraulic stimulation design and for use in analyzing casing and cement integrity.

SPE paper 35681 ("Neutron logs improve interpretation of foamed cement, even in concentric casing") was presented at the 1996 SPE Western Regional Meeting. It describes a method for using both open hole and cased hole neutron logs to evaluate foam cement qualitatively. Open and cased hole neutron logs are first environmentally corrected by removing the casing and cement effects. The ratio of the open and cased hole logs is then obtained and used as a cement quality indicator. A potential problem with this method is that the amounts of casing and cement effect corrections cannot be determined. The amounts of correction in cement correction charts assumes a perfect cement condition. Furthermore, taking the ratio of the open and cased hole logs reduces the dynamic range of the measurement sensitivity.

Thus, there is a need for a method for well cement testing that uses a non-acoustic logging tool and is better able to evaluate and detect fluid channels in light weight and foam cements.

SUMMARY OF THE INVENTION

In one embodiment, the invention is a method for evaluating cement integrity in a cased well drilled into a subsurface formation with a cement sheath installed in an annular region between the well casing and the formation, using a logging tool with a neutron source and one or more neutron or gamma ray detectors, comprising:

obtaining an open hole neutron log and hole dimensions acquired from the well before casing and cementing, and obtaining a cased hole neutron log and related information including one or more of casing size and weight, cement weight, and mud weight, acquired from the well after casing and cementing;

with the open and cased hole neutron logs, hole dimensions, and related information as input quantities, using a mathematical model, operated on a computer, to determine a volume of fluid filled channels in the cement sheath; and estimating the cement integrity based on the fluid filled channel volume.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The current invention provides a method to quantitatively evaluate cement quality with a neutron logging tool, i.e. through neutron porosity logging measurements. The neutron logging tool was the first nuclear device to be used to obtain an estimate of formation porosity in down hole environments. It is based on the fact that hydrogenous materials are very efficient in reducing energy or in the slowing down of fast neutrons by collision, because the nucleus of the hydrogen atom is a proton, and the theory of billiard ball collisions predicts up to 100% energy loss in a collision between equal mass particles. Other nuclei in the formation, such as silicon, calcium, iron, oxygen, carbon, etc, also contribute to the neutron slowing down to a lesser degree because of their heavier atomic weights. Since hydrogen atoms in rock formations are always associated with hydrocarbon and water in the pore space, neutron tool response in terms of epithermal or thermal neutron count rates correlates well with formation porosity. Neutron tool response is also affected by hydrogen nuclei outside the pore space such as cement and rocks containing clay minerals. Therefore, neutron tools actually measure formation porosity only in clean and fluid filled formations.

Figure 1:
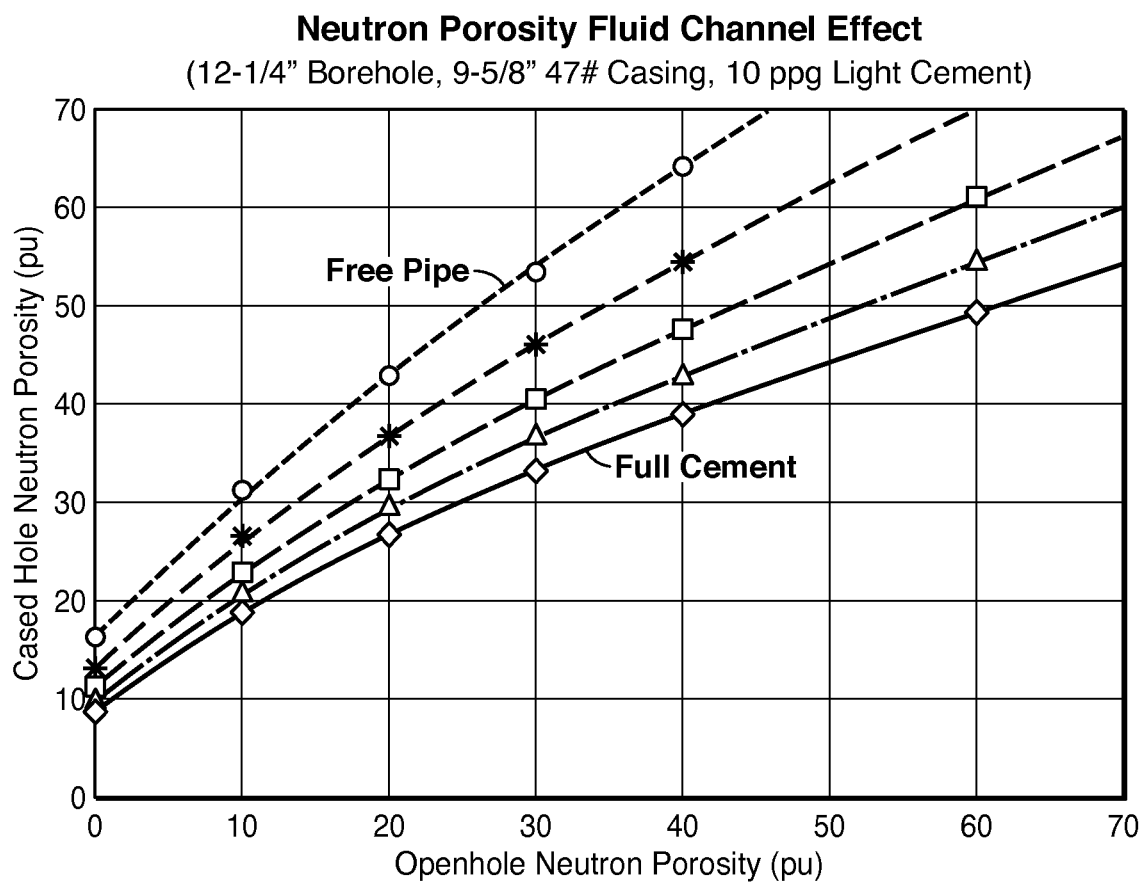
FIG. 1 shows a fluid channel characterization of the present invention, using a cross plot of open hole and cased hole neutron porosity.

A novel characterization process is illustrated in FIG. 1 in which the cross-plot of an open hole neutron log vs. cased hole neutron log is used to quantify the fluid-filled channel volume. Such a cross-plot provides the basis for the present invention. First, a brief description of neutron porosity logging is given.

The neutron tool consists of a source of fast neutrons, such as a radioactive chemical source made of an intimate mixture of americium beryllium material (AmBe), or a linear accelerator deuterium and tritium (DT) pulsed neutron source, and one or more neutron detectors at some distance away from the source that are sensitive to much lower energy neutrons. The detector response in terms of either neutron count rate itself or the ratio of the count rates is characterized by running a tool in a series of standard rock formations in the laboratory. These fluid filled formation standards or pits have standard borehole size and a range of porosity values. A calibrated neutron tool would read the "true" formation porosity only under the logging conditions in which it was characterized. Otherwise, environmental corrections are applied to the measured log to remove borehole mud weight and salinity, casing, and cement. Logging service companies publish chart books for all their tools. For instance, "Schlumberger Log Correction Charts," a Schlumberger publication (2010).

It is straightforward to parameterize the relationship between the open and cased hole relationships indicated in FIG. 1 in a computer program. The open hole neutron log is run and acquired before casing and cement is in place. Environmental corrections such as hole size, mud weight and salinity may be applied to the open hole neutron log if they are different from standard conditions. Thus, the corrected open hole neutron porosity represents the true formation neutron porosity. The cased hole neutron log is acquired after the well is cased and cemented, and no environmental corrections are applied to the cased hole neutron log. (Casing and cement corrections are no longer accurate when cement has fluid filled channels.) Predetermined casing and cement correction charts such as the aforementioned Schlumberger Log Correction Charts are not adequate for a cement sheath with channels, because these correction charts are built in perfect cement conditions.

Figure 2:
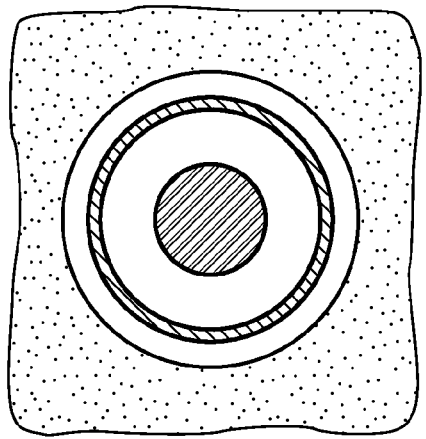
FIG. 2 shows a schematic drawing of a fully cemented wellbore (left) and a fluid-filled wellbore without cement, or free pipe (right)
Figure 2:
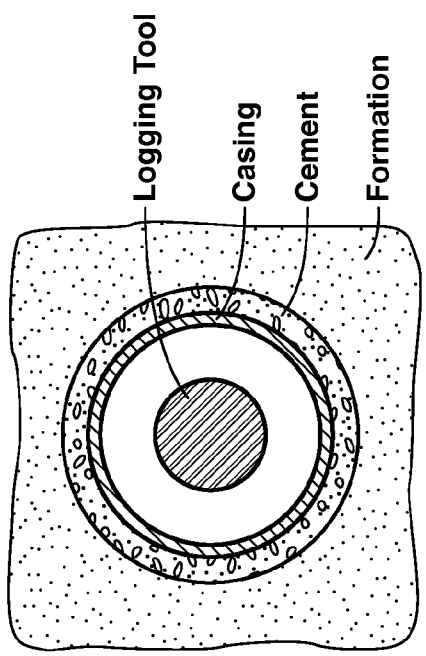
Figure 3:
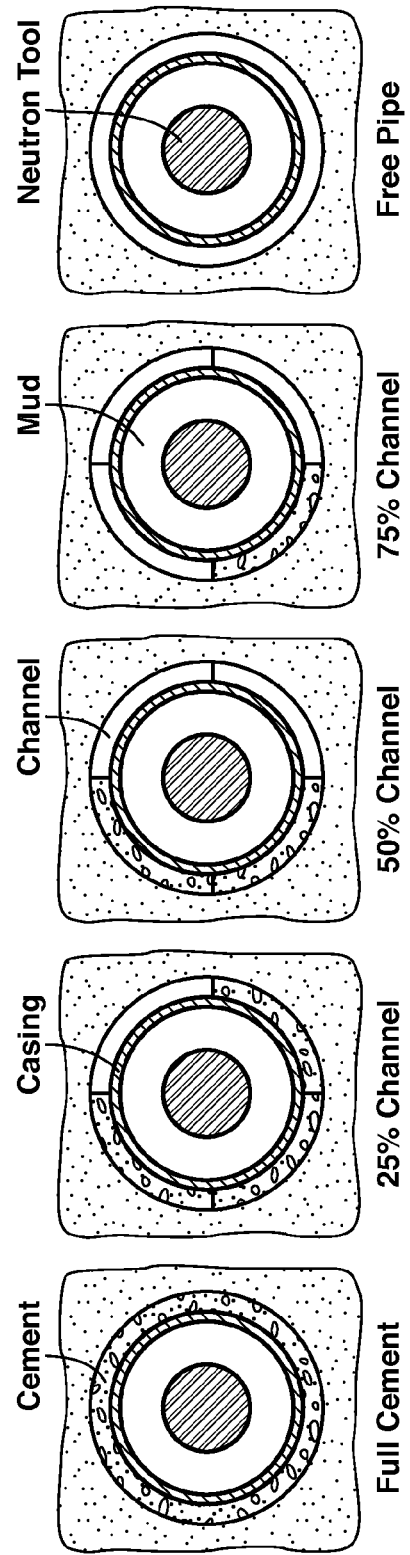
FIG. 3 is a schematic drawing of wellbores with, from left to right, progressively less cement and more fluid filled channels: full cement, 25%, 50%, 75% fluid-filled channels, and free pipe.

The present inventive method is demonstrated with synthetic neutron porosity data generated by Monte Carlo simulations. The nuclear transport modeling code, MCNP5, has been widely used for nuclear logging tool design and response characterization in oil and gas industry ("MCNP, a General Monte Carlo N-Particle Transport Code," Version 5, Los Alamos National Laboratory, LA-UR-03-1987, Revision 2008). MCNP5 was used to generate the curves in FIG. 1. FIGS. 2 and 3 illustrate the scenarios modeled. FIG. 2 shows the two end points in a 12¼" well with 9⅝" casing, which correspond to a fully cemented well (shown on the left) and a well with casing only, i.e. free pipe, with the annular region between the casing and the formation filled with fluid (shown on the right).

FIG. 3 shows five scenarios with increasing channel volume from left to right, and tool response is illustrated in FIG. 1. Between the two endpoints of FIG. 2 are shown scenarios in which the annular region is 25% fluid filled, 50% fluid filled, and 75% fluid filled. The five characteristic lines in FIG. 1 correspond to the five channel scenarios shown in FIG. 3. The upper-most line in the FIG. 1 cross-plot represents the free pipe, and the bottom-most line represents the fully cemented well, with the three lines in between representing sequentially less channel volume, from top to bottom. Notice that the dynamic range of the tool response increases as neutron porosity increases. In other words, the five curves are more spread apart in the upper right of the cross-plot than at the lower left.

Figure 4:
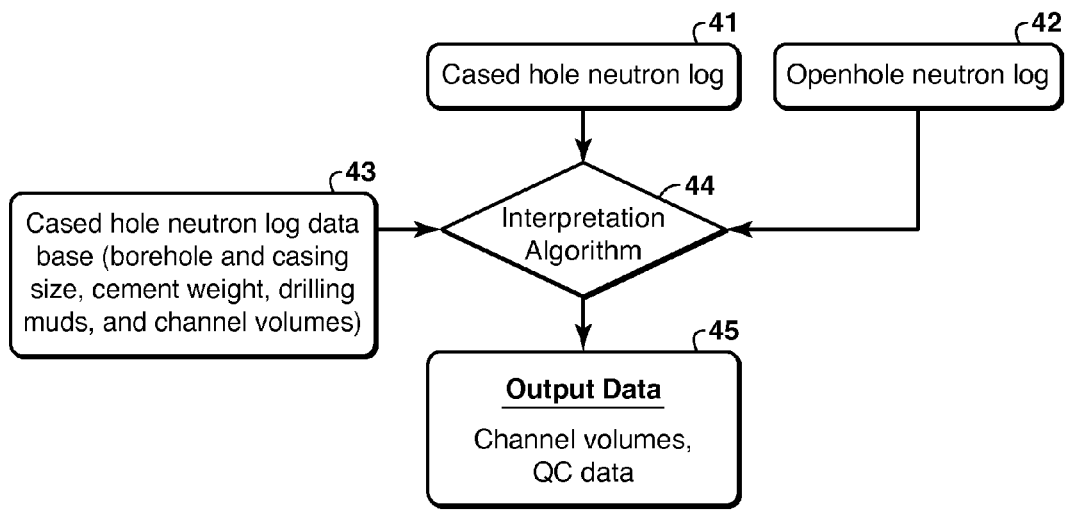
FIG. 4 is a flowchart showing basic steps in one embodiment of the present inventive method.

FIG. 4 shows basic steps in one embodiment of the present invention. One of the key features of the present inventive method is to build and use a log response characterization database 43, built from either computer modeled or lab measured data, or otherwise compiled from experience or experimental data. This database consists of tool response in terms of open and cased hole neutron porosity values under a variety of borehole and formation conditions (borehole size, casing size and weight, cement type and weight, drilling mud weight and composition) and channel volumes. This database could consist of several cross-plots such as FIG. 1, or the information contained in the cross-plots, where each cross-plot corresponds to a certain selection of parameters, i.e. borehole diameter, casing diameter, material and thickness, and type of cement. The domain of these parameters needs to be sampled with sufficient density such that any given actual set of parameters can be interpolated in the database with reasonable accuracy.

Each set of well parameters for a particular well completion will define a unique response relationship as depicted in FIG. 1, an example in which the borehole size is 12¼" and well was completed with 9⅝" 47 lbm/ft (ppf) weight steel casing and 10 lbm/gal (ppg) cement. Let us assume that the open hole porosity reads 30 percent in porosity units ("pu") at a particular measured depth ("md"). Then, if the cased hole neutron porosity reads 40 percent pu at that measured depth, a graphical interpretation method involves drawing a vertical line at 30 pu on the x-axis (open hole porosity) and drawing a horizontal line at 40 pu on the y-axis (cased hole porosity). The two lines will interact on the cross-plot. In this particular case, the intersection falls on the characteristic curve representing 50% channel volume. This is the channel volume interpretation at this depth.

A key feature of the present invention is using the raw or uncorrected cased hole neutron porosity, which will be different from the open hole porosity because of the presence of casing and cement. Environmental corrections for casing and cement will ideally (if they are perfect) remove the effects to make the cased hole porosity be the same as the open hole porosity. When there are fluid channels in the cement, the corrections are no longer adequate.

Referring to FIG. 4, the inputs to the present inventive method are open (42) and cased hole (41) neutron porosity logs and parameters including open hole caliper and cement type and weight (43). The caliper is a hole size measurement device, and the caliper measurement should be close to the drill bit size if the hole is in gauge. The caliper will measure hole enlargements such as washouts, and reduced hole size where there is excessive mud cake buildup after mud filtrate or the liquid phase invades the formation. Basically, the input quantities will ideally include a value for every parameter in the multi-parameter database 43 except channel volume fraction, which is the unknown quantity that is being sought. The interpretation process may be performed using a computer, and the interpretation algorithm (44) may use, for example, either a lookup table type of method or a more complicated interpolation approach to go into the multi-parameter database and compute the channel volume (45), and also may optionally produce a set of QC parameter and flags to define the data quality. Conventional cement bond logs acquisition and interpretation using acoustic tools may optionally also be carried out.

Figure 5:
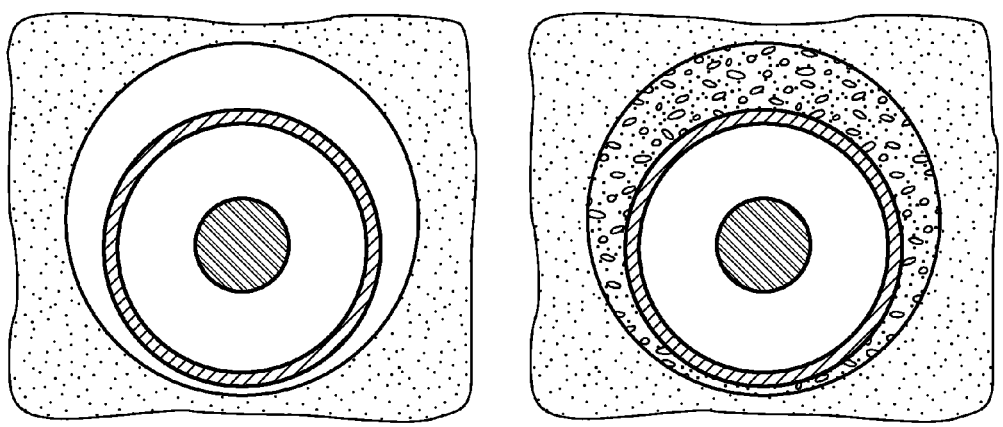
FIG. 5 is a schematic drawing of a wellbore with eccentric casing (left) and the same wellbore with the eccentric casing cemented (right)
Figure 6:
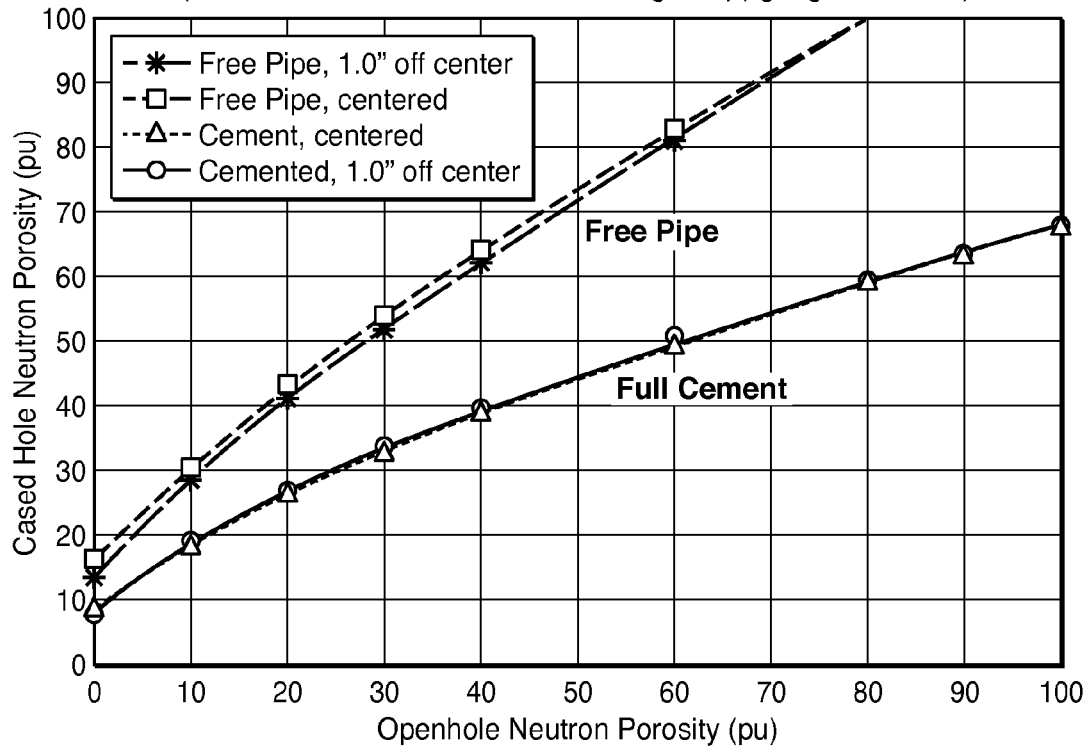
FIG. 6 is a cross plot of open hole and cased hole neutron logs with centralized and 1" ecentralized channels.

Modeling results in FIGS. 5 and 6 demonstrate that the present inventive method is robust and insensitive to casing eccentricity in a 12¼" well with 9⅝" casing. Tool response in a centered casing case (broken line curves) and a 1" eccentered case (solid line curves) were modeled and compared in fully cemented and free pipe conditions, and the results shown in FIG. 6 indicate a desirable lack of sensitivity to typical casing eccentricity. (The upper curves and corresponding data points represent the free pipe, and the lower curves and data points represent the fully cemented pipe. For the fully cemented pipe, the centered and eccentric curves almost completely overlie one another.)

Figure 7:
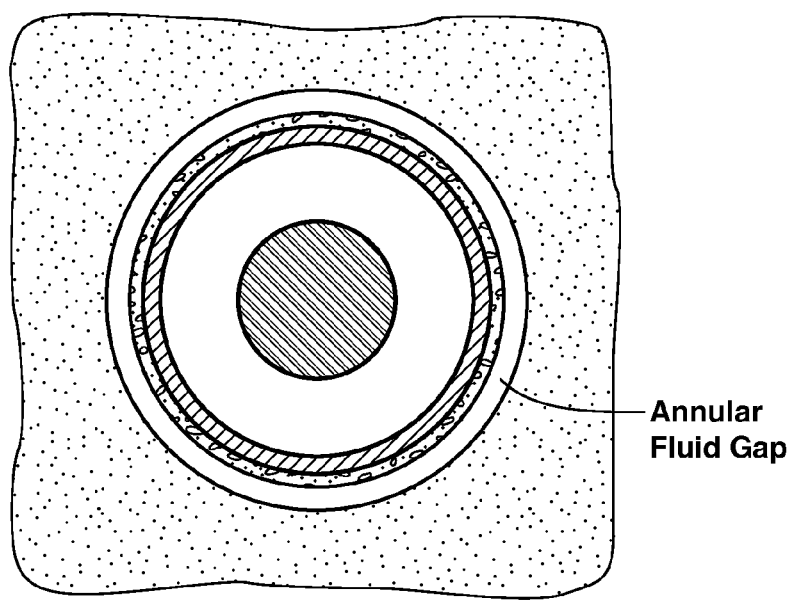
FIG. 7 illustrates the case where the fluid filled channel is an annular gap between the casing and the formation.
Figure 8:
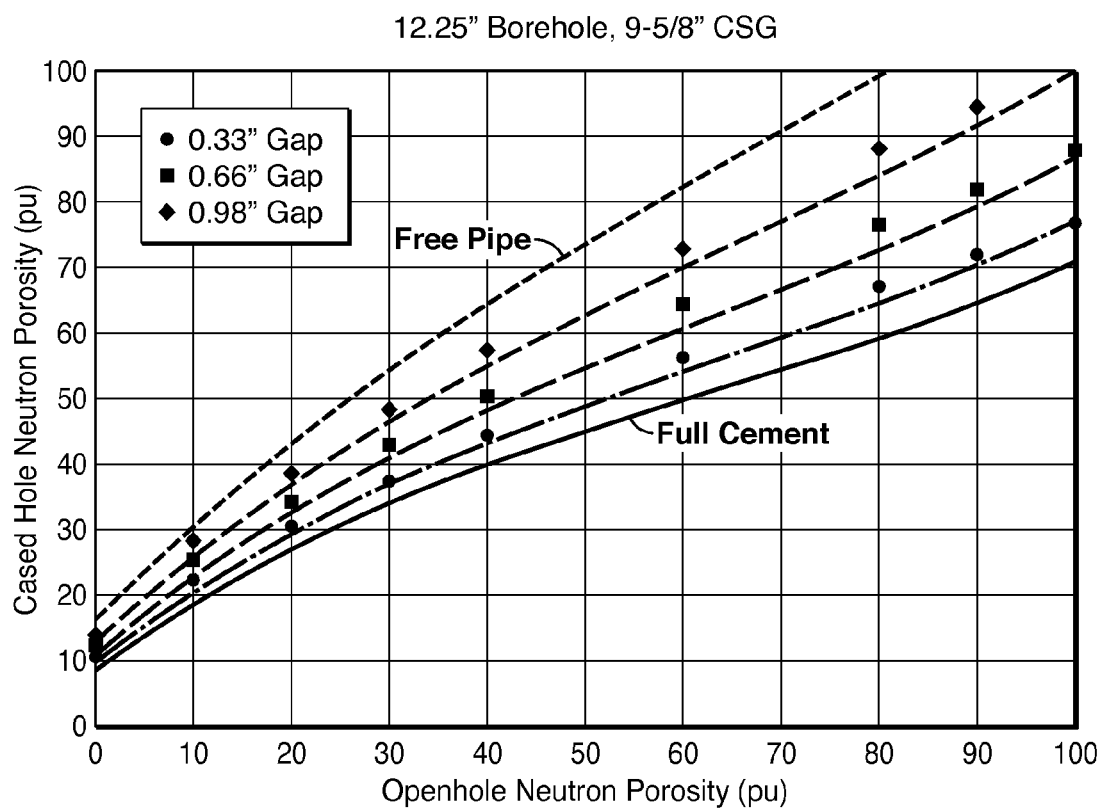
FIG. 8 is a plot comparing neutron log sensitivites of annular fluid gap vs. rectangular channels.

FIGS. 7 and 8 show the modeling results of channel shape influence on log response by comparing fluid channels formed by the annular fluid gap illustrated in FIG. 7 and channels of near rectangular shape of the type illustrated in FIG. 3. (In the appended claims, the term channel is used to refer to any fluid filled void in the cement, regardless of shape.) The curves shown in FIG. 8 are the same as in FIG. 1, and they represent the rectangular channels. The curves progress from the free pipe case at the top to the full cement case at the bottom, in volume increments of 25%. The discrete data points, i.e. circles, squares, and diamonds, represent the annular gaps. In the comparison study the volumes of the channels and gaps remain the same, as shown in Table 1. It can be observed in FIG. 8 that, for channels with equal volumes, annular channels represented in dots are in close agreement with rectangular channels represented in lines. This confirms that the present inventive method detects the channel volume regardless of channel shape.

TABLE 1

Annular fluid gap thickness and corresponding volume fractions
Annular Fluid Gaps

| Thickness (in) | Thickness Fraction | Volume Fraction |
|---|---|---|
| 0.328 | 0.25 | 0.27 |
| 0.656 | 0.50 | 0.53 |
| 0.984 | 0.75 | 0.77 |
| 1.313 | 1.00 | 1.00 |

The tool design configuration used in the modeling study closely resembles a typical commercial tool with a neutron source and two neutron detectors housed in a mandrel. It is preferred that in practice, the neutron tool be run in the center of the wellbore with a centralization device.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention may be computer implemented.

The invention claimed is:

1. A method for evaluating cement integrity in a cased well drilled into a subsurface formation with a cement sheath installed in an annular region between the well casing and the formation, comprising:
    obtaining an open hole neutron log and hole dimensions acquired from the well before casing and cementing, and obtaining a cased hole neutron log and related information including one or more of casing size and weight, cement weight, and mud weight, acquired from the well after casing and cementing;
    with the open and cased hole neutron logs, hole dimensions, and the related information as input quantities, using a mathematical model, operated on a computer, to determine a volume of fluid filled channels in the cement sheath; and
    estimating the cement integrity based on the fluid filled channel volume.

2. The method of claim 1, wherein the mathematic model includes a multi-parameter log response database comprising open hole and cased hole neutron-source logs corresponding to a range of parameters including one or more of borehole size, casing size and weight, cement properties, mud properties, and channel volume fraction, said parameter range encompassing values of the parameters applicable to said cased well drilled into the subsurface formation.

3. The method of claim 2, wherein the multi-parameter log response database is developed from computer-modeled computations.

4. The method of claim 3, wherein the computer-modeled computations are generated by Monte Carlo simulations using a nuclear transport modeling code.

5. The method of claim 2, wherein the multi-parameter log response database is developed from laboratory measurements.

6. The method of claim 2, wherein the mathematical model identifies a closest-fit fluid filled channel volume fraction from the multi-parameter log response database, or interpolates within the multi-parameter log response database to obtain a fluid filled channel volume fraction.

7. The method of claim 1, wherein said neutron source is a chemical source or an accelerator source, and said neutron detectors are thermal or epithermal neutron detectors.

8. The method of claim 1, wherein the cement is one of regular, light weight, and foam cements.

9. The method of claim 1, wherein the using a mathematical model includes computer-modeled computations generated by Monte Carlo simulations using a nuclear transport modeling code.

10. The method of claim 1, wherein no environmental corrections are applied to the cased hole neutron log.

11. A method for evaluating cement integrity in a cased well drilled into a subsurface formation with a cement sheath installed in an annular region between the well casing and the formation, the method comprising:
    obtaining, by using a logging tool with a neutron source and one or more neutron or gamma ray detectors, an open hole neutron log and hole dimensions acquired from the well before casing and cementing, and obtaining, by using a logging tool with a neutron source and one or more neutron or gamma ray detectors, a cased hole neutron log and related information including one or more of casing size and weight, cement weight, and mud weight, acquired from the well after casing and cementing;
    with the open and cased hole neutron logs, hole dimensions, and the related information as input quantities, using a mathematical model, operated on a computer, to determine a volume of fluid filled channels in the cement sheath; and
    estimating the cement integrity based on the fluid filled channel volume.

* * * * *